Figure 8:
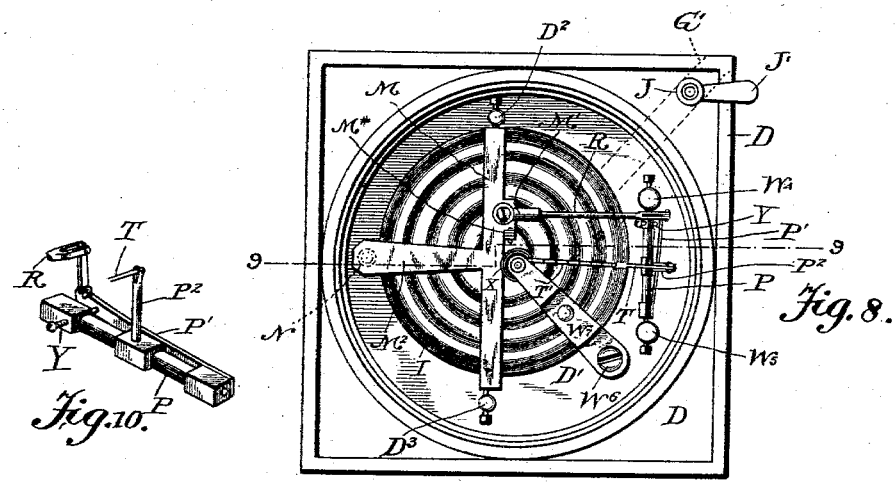

No. 634,687. Patented Oct. 10, 1899.
P. HARTENFELS.
GAS LEAK INDICATOR.
(Application filed July 29, 1899.)
(No Model.) 2 Sheets—Sheet I.
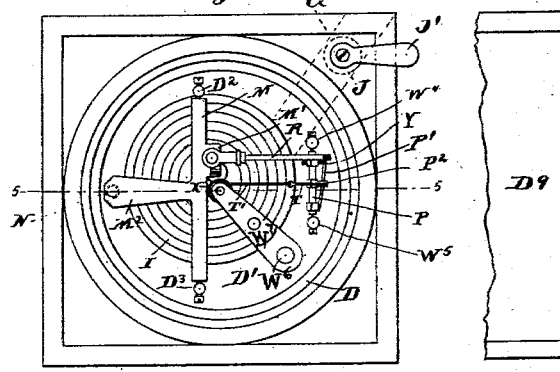
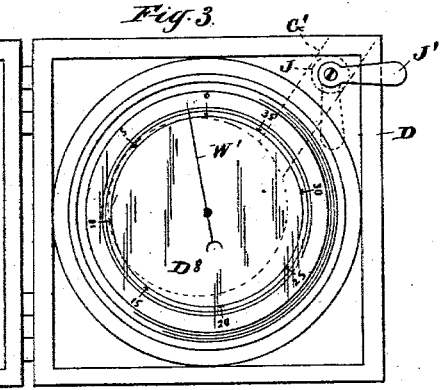
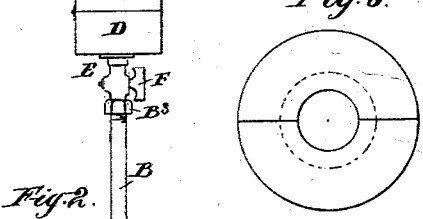
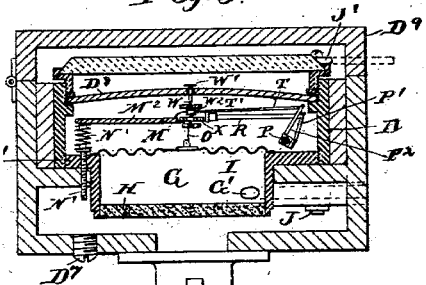
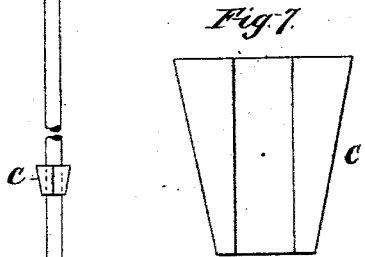
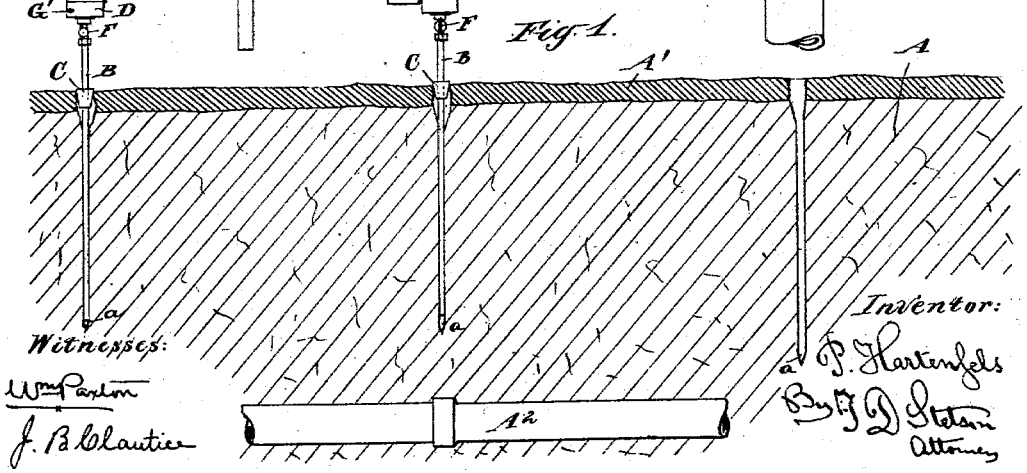
Witnesses:
Inventor:
P. Hartenfels No. 634,687. Patented Oct. 10, 1899.
P. HARTENFELS.
GAS LEAK INDICATOR.
(Application filed July 29, 1899.)
(No Model.) 2 Sheets—Sheet 2.

Witnesses Inventor
P. Hartenfels
Attorney

UNITED STATES PATENT OFFICE.

PHILIP HARTENFELS, OF NEW YORK, N. Y.

GAS-LEAK INDICATOR.

SPECIFICATION forming part of Letters Patent No. 634,687, dated October 10, 1899.

Application filed July 29, 1899. Serial No. 725,476. (No model.)

*To all whom it may concern:*

Be it known that I, PHILIP HARTENFELS, a citizen of the United States, residing in the borough of Manhattan, in the city and State of New York, have invented a certain new and useful Improvement in Gas-Leak Indicators, of which the following is a specification.

The invention is adapted to serve in the earth over gas-mains, to indicate, without requiring labor, skill, or time, the location and the approximate magnitude of a leak.

The gas from a leak spreads in all directions among the earthy particles and emerges at the surface distributed over a large area. The saturation is obviously the strongest in the immediate vicinity of the leak. My apparatus is adapted to indicate above the surface of the ground the volume of the gaseous matter filling the interstices in the earth at a certain depth below. I make a row of holes over the gas-pipe and force gently down into each a hollow rod or small tube, open at the bottom, and apply upon the upper end a removable instrument carrying a revoluble index with connections by which the latter is actuated and turned to a greater or less extent according as the air in the earth at that point is saturated with gas.

The principle on which the apparatus acts depends on the osmotic action of certain porous substances in the presence of a mixture of illuminating-gas with the atmospheric air. It has long been known that unglazed porcelain and several other substances will transmit such gas more rapidly than air, and it also has been long known that by providing a chamber having one side formed of such material and containing pure air and immersing such chamber in a mixture of air and gas, both at ordinary pressure, the illuminating-gas will, by the osmotic action sometimes known as "endosmose," enter through the porous material and mingle with the air in the chamber, and under such conditions will raise the pressure in the chamber, which may be termed the "osmotic" chamber, and make the pressure of the mingled air and gas appreciably higher than the atmosphere outside. In my apparatus such increased pressure acting on a yielding diaphragm actuates proper multiplying mechanism and indicates on a graduated dial the proportion of the gas which is mixed with the air in the osmotic chamber, and consequently the very nearly corresponding proportion of the gas and air in the interstices in that portion of the earth adjacent to the lower end of the tube. After observing and noting the indications thus obtained at one point the apparatus may be rapidly restored to the ordinary condition ready for subsequent use. I make the instrument detachable from the tube, so that it may be rapidly transferred from one tube to another, several tubes being previously set in different holes, or the work of setting the tubes in the earth may be conducted simultaneously with the observations, the same operator or an assistant going ahead and setting a tube in the earth while the instrument is being exposed to the mixture received through another tube in another hole.

I attach to each tube a yielding tapering plug, which is capable of being slid up and down thereon and adapted to instantly make a tight joint around the tube at the surface of the earth, even if the hole is considerably too large.

I provide a cock for connecting the general interior of the apparatus with the required penetrating-tube and for opening and closing the connection between the osmotic chamber and the external atmosphere. I provide also for adjusting the indications to operate correctly under varying conditions, and I provide for insuring that the chamber is open for ventilation whenever it is put away after use.

The accompanying drawings form a part of this specification and represent what I consider the best means of carrying out the invention.

Figure 9:
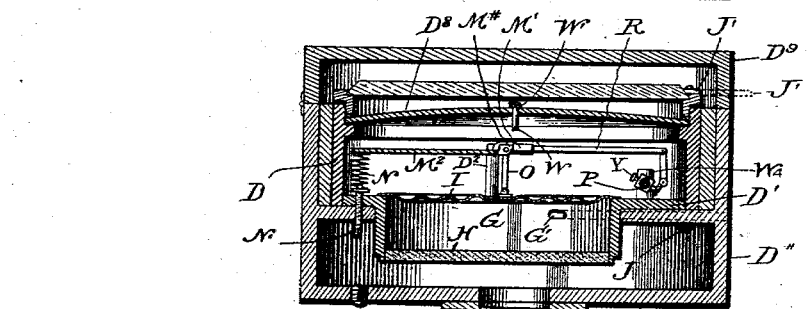
Figures 10, 11:
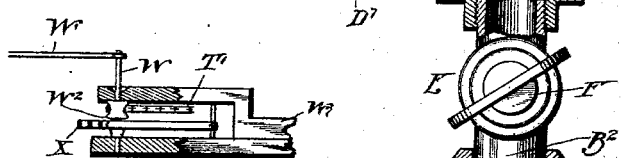

Figure 1 is a vertical section of a portion of a street with the gas-main therein. This shows my instrument applied in two places with a hole prepared to receive it in a third place. Fig. 2 is a corresponding view showing one instrument properly attached to a pipe on a larger scale. Fig. 3 is a plan view of one of the instruments with the lid in an open position. Fig. 4 is a corresponding view with the lid, index-hand, and dial removed. Fig. 5 is an elevation on a still larger scale, showing the upper portion only of my apparatus, the indicator proper being shown in vertical section. Fig. 6 is a plan view of one of the tapering plugs employed for closing the street-opening around the vertical tubes. Fig. 7 is a vertical elevation looking at the inner side of one of the sections composing the plug. Fig. 8 is a plan view of the indicator, similar to Fig. 4. Fig. 9 is a vertical section on the line 9 9, Fig. 8, showing the cock and coupling carried by the indicator. Fig. 10 is a perspective view, on an enlarged scale, of the smaller horizontal shaft forming part of the indicating mechanism. Fig. 11 is a detached view showing on an enlarged scale the pulley on the index-arbor and certain contiguous parts.

Similar letters of reference indicate corresponding parts in all the figures where they appear.

Referring to the drawings, A is the earth, A' an ordinary pavement thereon, and $A^2$ a gas-main extending along at any ordinary or convenient depth therein. When a leak is suspected and it is desired to ascertain the existence and location of such, a series of holes $a$ are produced in the earth above the gas-main.

B is a tube having its upper end B' screw-threaded. If there is a leakage of gas, the interstices in the earth instead of being filled with the ordinary atmosphere are filled with a mixture of such air with the illuminating-gas, and the proportion of the gas to the air will vary at different places, being greatest immediately over the leak.

The holes $a$ may be produced by previously driving down and removing a strong solid bar, as an ordinary crowbar, my tube B being afterward inserted and thrust down by the force of the hands, impelled, if necessary, by a few gentle blows.

C is a hollow plug or packing of soft wood or other sufficiently-yielding and practically air-tight material, formed in two independent sections, which fit with tolerable tightness around the tube B, but with freedom to be moved up and down. This being now brought down as tightly as practicable closes the space around the tube B, its outer face matching tightly to the earth or the pavement and the compression of the plug making the joint tight between it and the tube B.

The hollow connection E, carrying my instrument, is provided with a gas or other suitable cock F and with a coupling presented by the lower externally-flanged portion $B^2$ of said connection E, and an internally-threaded sleeve $B^3$ in revoluble engagement with the flange and adapted to be readily connected with or disconnected from the tube B by turning the sleeve. The cock F being closed, the connection E is tightly fixed to the tube B by matched screw-threads in the obvious manner, and on opening the cock F whatever mixture of gas and air obtains in the earth at that point rises through the pipe B, circulates past the cock, and filling the main case $D^{\divideontimes}$ enters through the material H into the osmotic chamber G and actuates the apparatus.

G is what I have above termed the "osmotic chamber," having sides of brass or other suitable material, and a peculiar base H of unglazed porcelain, adapted by its osmotic nature to transmit the illuminating gas freely while the air is not allowed to pass or is transmitted to a less degree.

I is a flexible diaphragm of thin elastic metal or other suitable material, impervious to either the gas or air, and consequently raised and lowered by changes in the proportions of the mixture of gas and air below.

I can use various forms of the mechanism for turning the index W' proportionally to the distention of the gaseous contents of the chamber G, and consequently of the proportion of illuminating-gas which is mixed with the air in such chamber. I have shown what I esteem a good form of such mechanism.

D is a case surrounding and protecting the mechanism, and D' is the base thereof, which I have shown about in the plane of the flexible diaphragm I. Two posts $D^2$ and $D^3$ on the base afford supports for a slightly-rocking shaft M, having a short arm $M^{\divideontimes}$ connected with the diaphragm by a link O, so that each change in the volume of the contents of the chamber G will, through this link, rock the shaft. The arm $M^2$ on this shaft is subject to the action of a gentle helical spring N, adjustable by a screw N'. The other arm M' on the shaft M and rocked therewith connects by a link R with an adjustable arm P' on a rocking shaft P, supported in posts $W^4$ $W^5$, planted on the base. A rigid arm $P^2$ extends upward from this shaft. A link T, attached to the arm, connects to a fine chain T' wound around a pulley $W^2$ on the shaft W, carrying the index W', before referred to, and carried in bearings in a bridge $W^7$, which is stiffly supported on a stout post $W^6$, fixed on the base.

The shaft W is subject to the action of a gentle spring X, which torsionally turns the pulley $W^2$ in opposition to the traction exerted on the chain. The effect of the whole is to turn the shaft W in the direction and to an extent corresponding to such change in the volume of the air and gas in the chamber G, the index W' turning to the left when the diaphragm I is raised and to the right when it is lowered—that is to say, when there is much gas present in the chamber G it penetrates the peculiar porous bottom H of the chamber G, and by adding its volume to the air already in such chamber causes the augmented contents to raise the yielding diaphragm I and, through the connections, to turn the index W' to the left, and when, on the contrary, there is less gas present in the chamber G, in consequence of the connection of the latter with pure atmospheric air or with a pipe B having less gas than that last tested, the gas will flow or circulate in the opposite direction through the osmotic bottom H, and the contents of G being reduced the flexible diaphragm I will sink and the index W' will be turned in the opposite direction.

Y is a screw which, acting on the long-inclined and slightly-elastic arm P', will change the ratio of the motions to adjust the mechanism to give a greater or less traverse of the index for any given change in the mixture in the chamber. The adjustment of the tension of the spring N by the screw N' induces a different effect—a change of the starting-point—that which the index W' maintains when the air in the chamber G is free from gas.

G' is a passage which communicates between the interior of the chamber G and the external atmosphere, controlled by a cock J, operated by a lever J', which is exposed on the upper face of the casing D just outside of the dial. When the cock J is in the open condition, this lever J' is in the position shown in dotted lines and comes within the casing D. When the cock is in the closed condition to allow the apparatus to be worked and give its indications by the index W', the lever J' extends out beyond the area of the casing D. In this position it prevents the cover $D^9$ from being closed, so that this cock J is sure to be opened and allow the complete ventilation of the interior of the chamber G whenever the instrument is put out of use.

A test can ordinarily be completed with sufficient accuracy for practical purposes in a brief period—say from one to two minutes after the cock F is opened. Then the instrument may be disconnected from the tube B and transferred to the next in the series, where the operation is repeated.

As soon as a test is completed the tube B may be drawn out of the hole and transferred to a new position. The holes $a$ in the earth may be carefully filled up or under some conditions may be left to become gradually filled with earth without involving any serious difficulties.

The tubes employed are ordinary sections of gas-pipe, which when withdrawn and the instrument detached will readily become ventilated from any traces of gas, thus further insuring accuracy of the instrument.

I provide for graduating large spaces on the dial $D^8$, so that while the instrument is supported face upward on the tube B, only a few inches above the surface of the earth, the position of the index may be plainly observed and recorded without requiring the attendant to stoop.

Ready access is afforded to the adjusting-screw N' through a bottom opening in the larger inclosing casing, closed by a screw-plug $D^7$.

I claim as my invention—

1. An apparatus for locating leaks, comprising a tube adapted to be inserted in the earth, and an osmotic chamber and coacting mechanism for operating an indicator by the changes of the tension of the air therein, combined substantially as herein specified.

2. An apparatus for locating leaks, comprising a tube adapted to be inserted in the earth, an osmotic chamber and coacting mechanism for operating an indicator by the changes of the tension of the air therein, and provisions for coupling the same together and disconnecting at will, combined substantially as herein specified.

3. An apparatus for locating leaks comprising a tube adapted to be inserted in the earth, an osmotic chamber and connected mechanism for operating an indicator by the changes of the tension of the air therein, and provisions for coupling the same together and disconnecting at will, and also provisions by the stop-cock F for permitting and forbidding the circulation of gas in the connected parts, combined and arranged for joint operation substantially as herein specified.

4. In an apparatus for locating leaks in gas-pipes, the combination with an osmotic chamber and mechanism for indicating the changes in the condition of the air, and a larger inclosing case, a discharge-passage G', and a valve J and operating-lever J', controlling the communication between such chamber and the external atmosphere, the lever being arranged to prevent the closing of the case except when the cock is opened, all substantially as and for the purposes herein specified.

5. In an apparatus for locating leaks in gas-pipes the combination with an osmotic chamber and indicating mechanism including an index, of a screw N' for regulating the normal zero position of the index, and an external case having an opening closed by a removable screw-plug $D^7$, for affording access to said screw, substantially as herein specified.

6. In apparatus for indicating leaks in gas-pipes the combination with an osmotic chamber and a diaphragm subject to variations of the pressure therein, of two pivotally-supported shafts, one of which is connected to the diaphragm, and links and connections between them, and with the arbor of an index W', substantially as herein specified.

7. In apparatus for indicating leaks in gas-pipes, the combination with an osmotic chamber and a diaphragm subject to variations of the pressure therein, of a pivotally-supported shaft M, connected to the diaphragm and having a spring-seated arm $M^2$, provisions for adjusting said spring, and links and connections between said shaft M and the arbor of an index W', substantially as herein specified.

In testimony that I claim the invention above set forth I affix my signature in presence of two witnesses.

PHILIP HARTENFELS.

Witnesses:
J. B. CLAUTICE,
M. F. BOYLE.